United States Patent [19]
Fisher et al.

[11] Patent Number: 5,884,863
[45] Date of Patent: *Mar. 23, 1999

[54] METHOD AND APPARATUS FOR DEPLOYING A WING

[75] Inventors: Jeffrey A. Fisher; Edward V. Miller, both of Huntsville, Ala.; Dennis Van Dam, Chattanooga, Tenn.

[73] Assignee: United Technologies Corporation, Hartford, Conn.

[*] Notice: The term of this patent shall not extend beyond the expiration date of Pat. No. 5,474,257.

[21] Appl. No.: 548,771

[22] Filed: Oct. 26, 1995

[51] Int. Cl.⁶ .................................................... G64C 31/02
[52] U.S. Cl. ...................... 244/49; 244/901; 244/138 R; 244/139; 244/13; 244/16
[58] Field of Search ............................. 244/13, 901–905, 244/139, 49, 140, 141, 16, 138 R, 138 A

[56] References Cited

U.S. PATENT DOCUMENTS

| Re. 26,427 | 7/1968 | Jalbert ................................ 148/33.1 |
|---|---|---|
| 2,764,375 | 9/1956 | Lemoigne ............................. 244/145 |
| 3,507,464 | 4/1970 | Rogallo ................................. 244/43 |
| 3,524,613 | 8/1970 | Reuter et al. ......................... 244/142 |
| 3,558,087 | 1/1971 | Barish ................................. 244/142 |
| 3,599,904 | 8/1971 | Condit et al. ........................ 244/38 |
| 3,679,157 | 7/1972 | Roberts et al. ....................... 244/141 |
| 3,749,337 | 7/1973 | Jalbert ................................. 244/145 |
| 3,822,844 | 7/1974 | Sutton ................................. 244/145 |
| 3,944,169 | 3/1976 | Bede .................................... 244/16 |
| 3,995,799 | 12/1976 | Bartolini ............................. 244/16 |
| 4,050,654 | 9/1977 | Heckman ............................. 244/49 |
| 4,116,406 | 9/1978 | Hamilton ............................. 244/16 |
| 4,116,407 | 9/1978 | Murray ............................... 244/16 |
| 4,708,078 | 11/1987 | Legaignoux et al. ................ 114/102 |
| 4,742,977 | 5/1988 | Crowell .............................. 244/123 |
| 4,846,423 | 7/1989 | Reuter ................................ 244/145 |
| 4,936,012 | 6/1990 | Shepherd ............................ 29/845 |

FOREIGN PATENT DOCUMENTS

| 2310258 | 12/1976 | France . |
|---|---|---|
| 2549393 | 5/1977 | Germany . |
| 2854939 | 7/1980 | Germany . |
| 3119865 | 12/1982 | Germany . |
| 3322047 | 12/1984 | Germany . |
| 1121181 | 10/1984 | Russian Federation . |
| 2050263 | 12/1984 | United Kingdom . |

OTHER PUBLICATIONS

Charles Libbey, "Free–Flight investigation of the deployment of a parawing recovery device for a radio controlled", NASA TN D–2044, Dec. 1963.

*Primary Examiner*—Galen L. Barefoot
*Attorney, Agent, or Firm*—Christopher T. Hayes

[57] ABSTRACT

The deployable wing of the present invention comprises an internal structure having diverging leading edge spars attached to a keel spar and cross spars to form a delta wing configuration. This internal structure is enclosed within a volume defined by a fabric sail having an upper section, a lower section, and fabric ribs disposed therebetween. This fabric sail volume is internally pressurized through a ram air intake at the nose stagnation point. This deployable wing can be folded, extracted from an aircraft and deployed in the air.

24 Claims, 9 Drawing Sheets

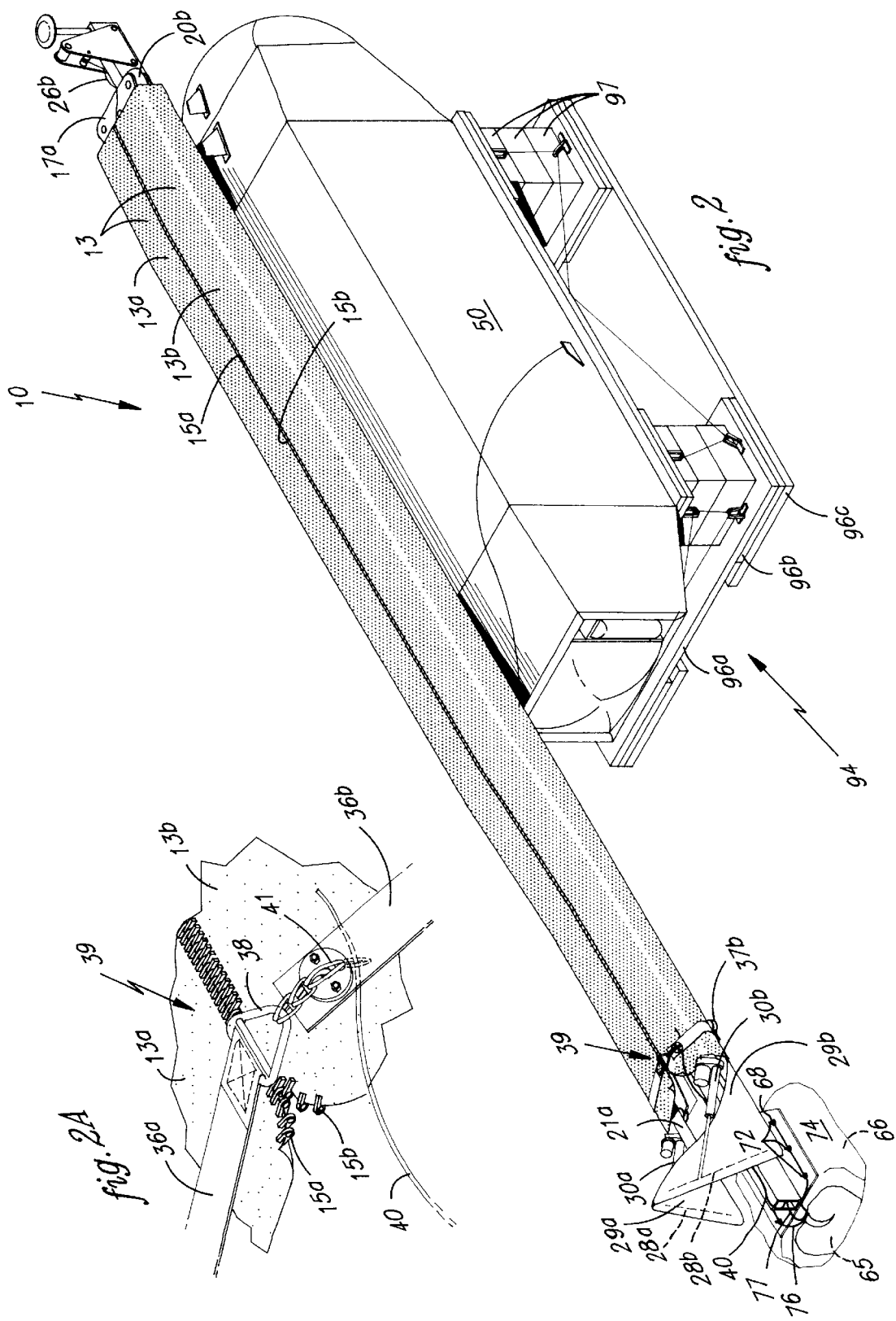

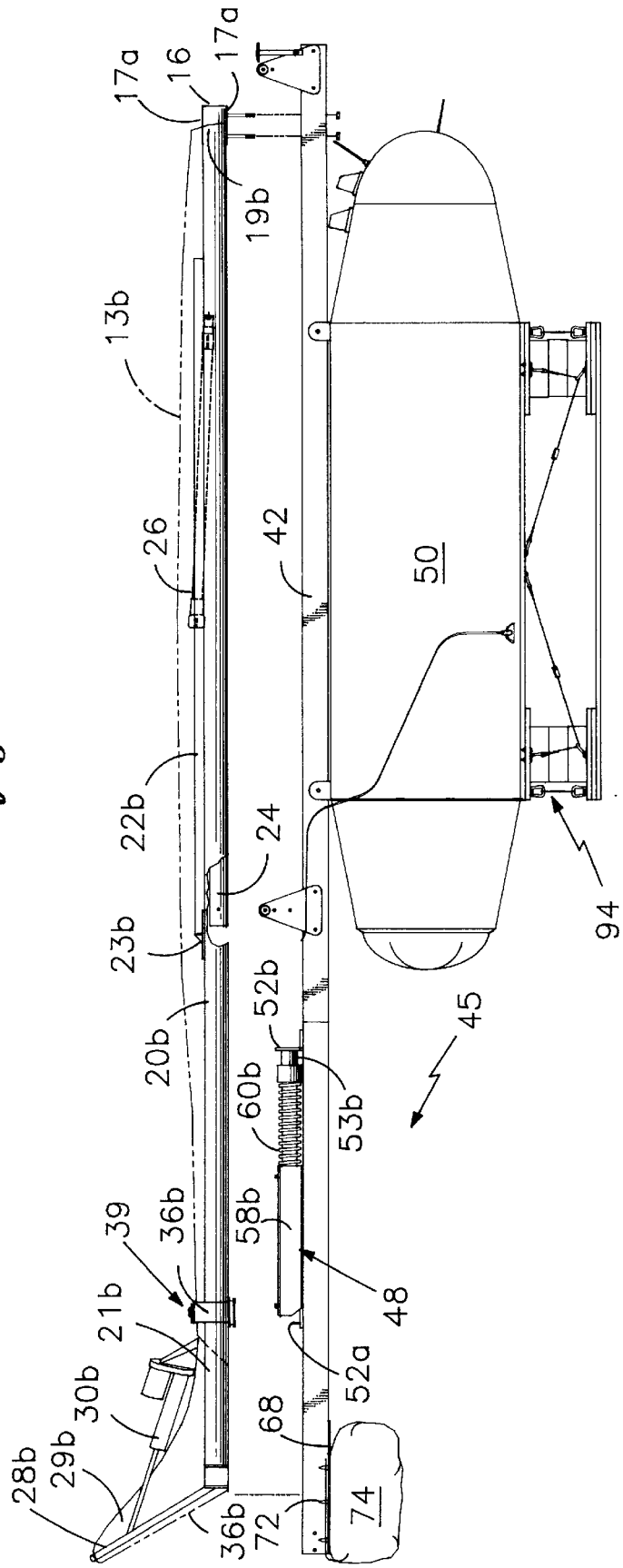

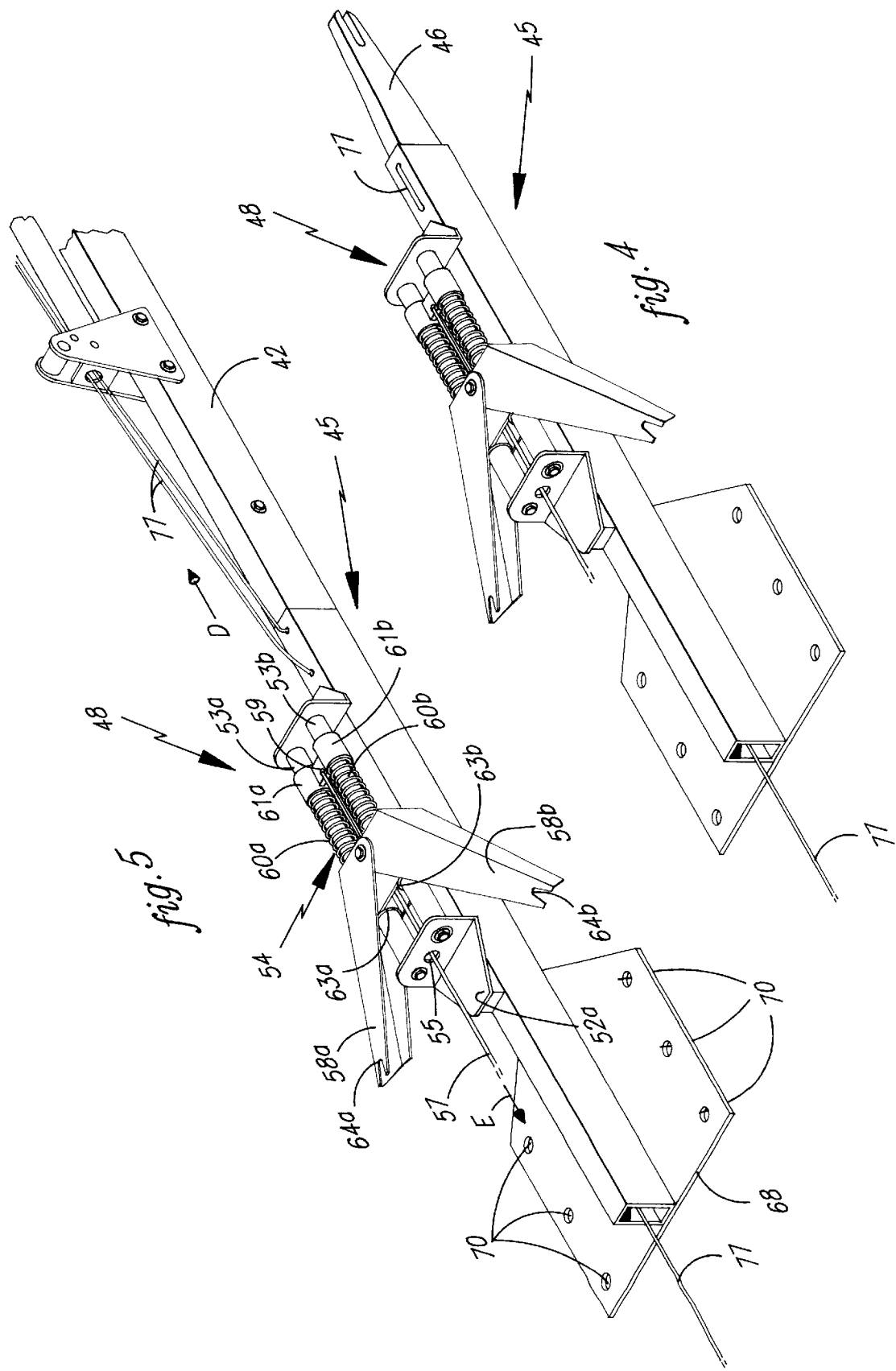

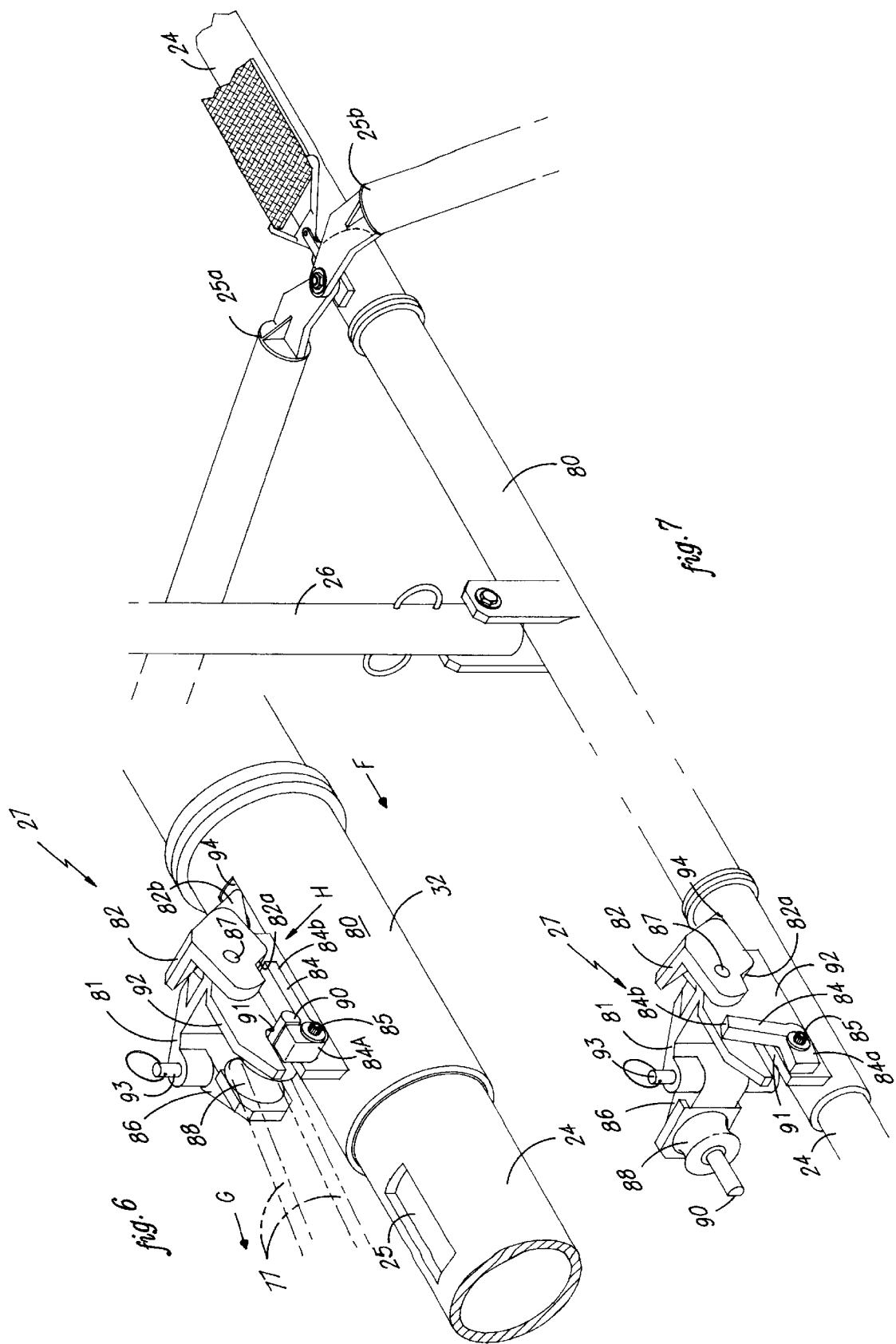

METHOD AND APPARATUS FOR
DEPLOYING A WING

BACKGROUND

1. Technical Field

The present application relates to a wing and especially to an improved method and apparatus for deploying a wing.

2. Background of Related Art

Hang gliders allow manned flight without the expense or restrictions of powered flight. These gliders are aerodynamically designed such that their lift-to-drag ratio (commonly known as glide ratio) is greater than about 10:1 such that the glider is capable of suspending a flyer for several hours under the proper atmospheric conditions. Hang glider designs range from the popular delta wing design commonly known as a Rogallo wing and intermediate gliders with glide ratios of about 10:1 with docile characteristics to competition gliders with glide ratios as high as 13:1, but with less stable characteristics. The original Rogallo wing (about 45° sweep) had a glide ratio of about 4:1, and modern Rogallo wings (about 30° sweep) have a glide ratio of about 10:1.

The Rogallo wing design largely resembles a traditional kite with a keel, cross members, and diverging leading edge members. Another hang glider design generally similar to the Rogallo wing is disclosed in U.S. Pat. No. 4,116,406 which issued to Hamilton on Sep. 26, 1978. This glider has a double surface fabric airfoil forming an envelope, disposed around a Rogallo frame. This airfoil is inflated during flight as air enters an opening in the nose and exhausts through nozzles in the underside along the trailing edge. Inflating the wing improves its lift at lower air speeds. This hang glider, however, is manually controlled via a weight shift control bar by a flyer harnessed to the glider and is only useful for manned flights and not for operations such as air drops of food, supplies, etc., where manned flights are either too dangerous or impossible.

Another hang glider design similar to the Rogallo wing and having a collapsible airfoil is disclosed in U.S. Pat. No. 4,116,407 to Murray. This hang glider comprises a wing which includes leading edge members, a keel and cross members in a traditional delta wing design. The wing further includes upper and lower flexible membranes, a first connector for attaching the upper flexible membrane to the upper aft section of the leading edge member and a second connector for attaching the lower flexible membrane to the lower aft section of the leading edge member. The flexible membranes are also joined together rearwardly of the leading edge member. At least one of the first and second connectors includes a track for receiving a member carried by one of the flexible membranes. The member cooperates with the track to attach the flexible membrane to the leading edge member. The leading edge members are also capable of being pivoted inwardly toward the keel to collapse the wing.

Parachutes, on the other hand, can and have been utilized for air drops of food, supplies, etc., in remote locations where landing an airplane is either impossible or dangerous. Although these parachutes are useful in reducing the ground impact of the dropped load, it is difficult to ensure the parachute reaches the targeted area. Depending upon the precise parachute release time, the atmospheric conditions during release and flight, and release altitude, the parachute may either reach its target or drift up to about 15 miles or more off course.

Patent application U.S. Pat. No. 5,474,257 which is hereby incorporated by reference, discloses a deployable wing comprising a double membrane fabric sail having an upper section disposed above and joined to a lower section, the sail having a leading edge with a front point, a trailing edge, and wing tips. The deployable wing further includes an internal structure disposed between the upper section and the lower section, the internal structure having two leading edge spars with a first end and a second end, said first ends pivotally connected together at approximately the front point, a keel spar connected to and disposed between the leading edge spars at the front point and extending rearward toward the trailing edge, and at least two cross spars pivotally attached to both the leading edge spars and a sliding mechanism which traverses along the keel. The wing also includes a plurality of fabric ribs disposed between and connected to the upper section and the lower section, the fabric ribs defining the shape of the fabric sail when inflated and have at least one slot through which the cross spars extend from the keel spar to the leading edge spars and ribs; and a ram air intake located on said leading edge at the stagnation point of the wing which inflates the wing during operation.

The wing disclosed in application U.S. Pat. No. 5,474,257 is remotely controllable and allowing for both unmanned flight and accuracy in reaching a targeted area which makes it useful for article recovery and delivery. The deployable wing is, however, the first of its type and it has been found that an improved apparatus and method for deployment of such a wing is desired.

The present application therefore provides an improved apparatus and method for deployment of a wing, preferably from an aircraft.

SUMMARY

The present application relates to a deployable wing including a fabric sail having an upper section joined to a lower section, an air intake opening and an internal structure disposed substantially between the upper section and the lower section. The internal structure includes at least two leading edge spars joined at a first end, a keel adjacent to and disposed substantially between the leading edge spars and at least two cross spars pivotally attached to the leading edge spars and the keel. The wing further includes a wing mounting member adjacent to and attached to both the keel and a payload and a detachable extension removably mounted to the wing mounting member. The detachable extension effectively increases the length of the mounting member to the full length of the wing in a closed configuration and allows the weight of the payload to be mounted forward.

BRIEF DESCRIPTION OF THE DRAWINGS

Various embodiments are described herein with reference to the drawings, wherein:

FIG. 2 is a perspective view of the deployable wing of FIG. 1 in a closed, or pre-deployment configuration.

FIG. 2A is an enlarged view of the strap mechanism of FIG. 2.

FIG. 3 is a side view showing the mounting of the deployable wing to a payload.

FIG. 4 is a perspective view of the detachable extension of the embodiment of FIG. 1.

FIG. 5 is a perspective view of the detachable extension in engagement with a wing mounting member.

FIG. 6 is a perspective view of the pulley mechanism of the embodiment of FIG. 1 in a closed configuration, prior to deployment.

FIG. 7 is a perspective view of the pulley mechanism of the embodiment of FIG. 1 in an open configuration, after deployment.

The figures are meant to further illustrate the various embodiments and not to limit the scope of the claimed invention.

DETAILED DESCRIPTION OF THE PREFERRED EMBODIMENTS

Figure 1:
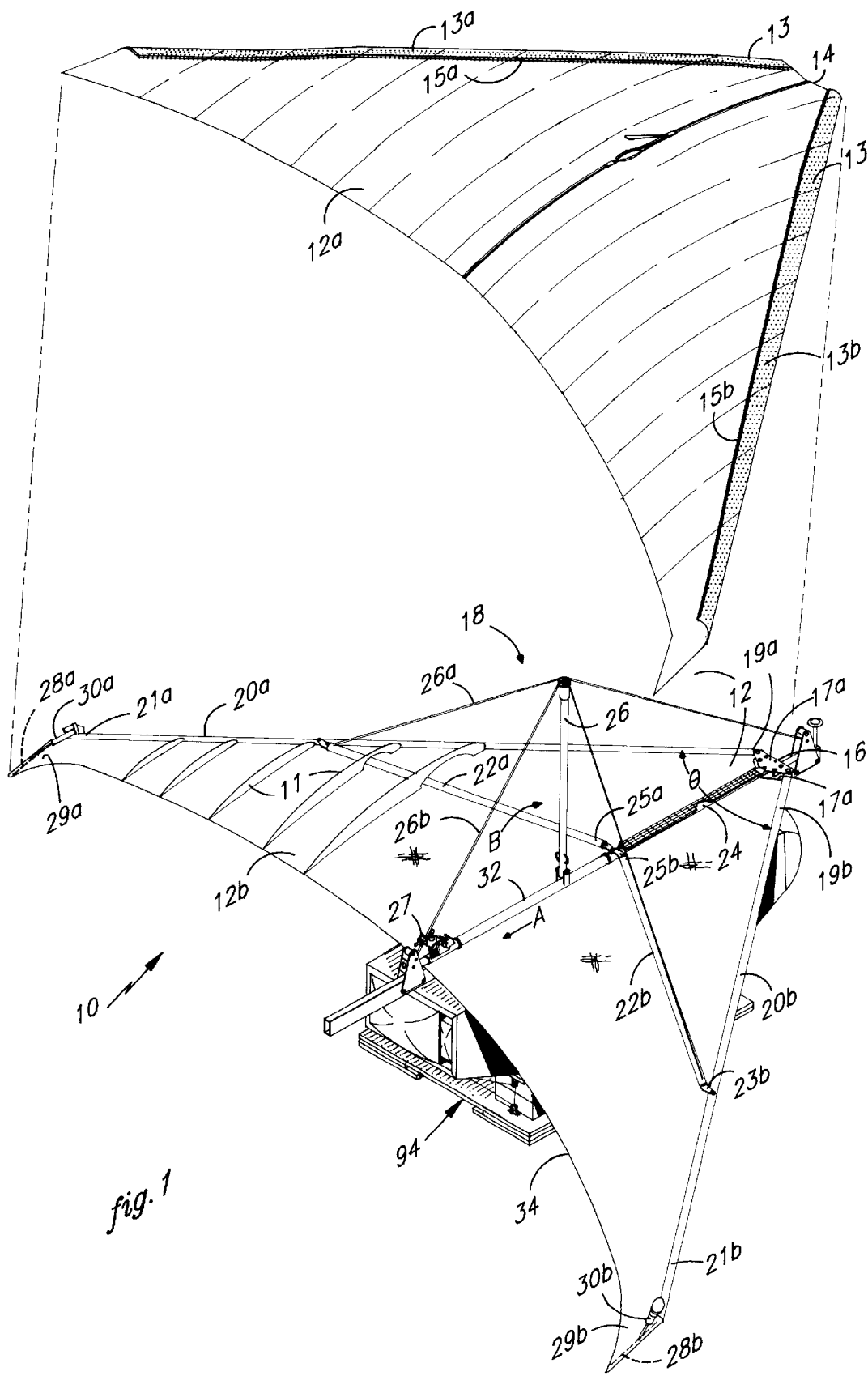
FIG. 1 is an exploded view of one embodiment of the deployable wing of the present application.

Referring now in specific detail to the drawings, with like reference numerals identifying similar or identical elements, FIG. 1 illustrates an exploded view of one embodiment of the deployable wing 10 of the present application. As illustrated in FIG. 1, wing 10 includes a fabric sail 12 and an internal structure 18. Fabric sail 12 includes fabric ribs 11 connected to an upper section 12a and a lower section 12b, the upper and lower sections 12a, b being joined substantially around their perimeter. Joining upper and lower sections 12a, 12b forms an envelope having a leading edge 20, a trailing edge 34 and wing tips 29a, b. The entire envelope can be filled with air through a ram air intake 14 preferably located at a foremost point 16 of the wing. Fabric sail 12 further includes an integral cover 13 comprising a first section 13a and a second section 13b, each of which is disposed along the leading edge of wing 10 as shown in FIG. 1. First and second sections 13a, 13b each further include complimentary zipper members 15a, 15b which matingly engage when wing 10 is in a closed position as described in greater detail hereinbelow.

Disposed between upper and lower sections 12a, 12b is internal structure 18. In the present embodiment: internal structure 18 comprises two leading edge spars 20a, 20b; two cross spars 22a, 22b; a keel 24; a kingpost 26 and a control device, such as elevon struts 28a, 28b. First ends 19a, 19b of leading edge spars 20a, 20b, respectively, are pivotally attached between faceplates 17a and 17b to form foremost point 16. The length of each leading edge spar is dependent upon the desired size of wing 10, which is only limited by practical considerations: size once folded, desired cruise speed, weight of the payload, etc. In the open, or deployed position, leading edge spars 20a, 20b form an angle θ therebetween. The size of this angle θ depends upon aerodynamic considerations including aspect ratio, yaw stability, and deployment simplicity, among others. Typically, θ ranges from about 90° to about 150° with about 105° to about 110° preferred due to simplicity of the deployment mechanism geometry. Angles greater than about 150° result in more complex, and therefore less desirable, mechanical/structural geometry and decreasing yaw stability, while angles less than about 90° result in decreasing glide ratio. Yaw stability is where wing sweep allows the wing to tend to maintain its flight directly into the wind, commonly known as maintaining the yaw heading. As the wing yaws, the windward wing tends to drag more than the leeward wing, thereby correcting for the yaw.

Cross spars 22a, 22b include outboard ends 23a, 23b which are pivotally attached to leading edge spars 20a, 20b, respectively, and further include inboard ends 25a, 25b which are pivotally attached to keel 24 via a common slider 32. Also attached to slider 32 is pulley mechanism 27 and kingpost 26. Kingpost 26 is pivotally attached to slider 32 such that linear movement of the common slider in the direction of arrow "A" causes movement of kingpost 26 in the direction indicated by arrow "B". Pulley mechanism 27 and kingpost 26 are described in greater detail below. Cross spars 22a, 22b provide structural integrity to the wing 10 by providing strength to the leading edge spars to ensure that in the deployed position the leading spars remain in the open position with angle θ therebetween. The distance between the attachment point of the outboard ends to their respective leading edge spars and the inboard ends to the keel determine the length of cross spars 22a, 22b.

With continued reference to FIG. 1, keel 24 is mounted at one end between faceplates 17a, 7b, is mounted at an opposite end between plate members 44a, b and is disposed between the leading edge spars 20a, 20b. Keel 24 further includes a slot 25 disposed therethrough (FIG. 6) for receipt of a tab 82b as described hereinbelow. The length of the keel 24 is substantially equivalent to the chordwise length of the wing at the root (very center line) which, as with the leading edge spars' 20a, b length, is determined on a practical basis with aeronautical considerations effecting the ultimate size. Keel 24 similarly provides structural integrity to wing 10 by ensuring that the wing 10 opens to and maintains its full length from the leading edge to the trailing edge 34, commonly known as the wing's chordwise length. Keel 24 also connects payload 50 to wing 10 via mounting member 42 (FIG. 3) as described in greater detail below.

Pivotally connected to second ends 21a, 21b of the leading edge spars are elevon struts 28a, 28b, respectively. The elevon struts 28a, 28b are each connected to a motor or fluid actuator 30a, 30b which is located externally of fabric sail 12 and is mounted to the leading edge spars. The motor or actuator is conventional in design and operates to deflect or rotate each elevon struts 28a, 28b independently, out of the plane of the sail, thereby controlling the flight of the wing. By rotating the elevon struts, wing tips 29a, 29b are twisted up or down relative to the leading edge. This helical twisting of the sail results in an aerodynamic force sufficient to pitch or roll the wing. Rotating or deflecting the elevon struts in unison generates an aerodynamic force substantially behind the pressure center of the wing which is located at the point about 55% down the keel from the foremost point 16, thereby forming a moment force about the pressure center which is used for pitch control of the wing. By rotating or deflecting the elevon struts 28a, 28b singularly or in opposite directions, aerodynamic forces at the wing tips 29a and 29b can be controlled in magnitude and direction, up or down. For example, if the elevon strut 28a is rotated up while elevon strut 28b is rotated down, a downward force is generated on tip 29a and an upward force on tip 29b, resulting in a roll or turn in the direction of strut 28a. Other conventional devices can be employed such as pneumatic and hydraulic devices, among others.

These elevon struts 28a, 28b, or other control devices, can be operated with any conventional motor capable of generating sufficient torque to overcome the aerodynamic forces at a speed sufficient for control response. Factors important in determining the required torque include wing area, wing loading, aspect ratio, and elevon strut length, among others. A wing having a 30 foot wing span, for example, with a sail area of about 190 ft$^2$ and a 700 lb load requires about 40 to about 80 ft.lb torque while a 15 ft wing span wing with an area of 45 ft$^2$ and a 90 lb load needs about 15 to about 25 ft.lb torque for control.

The internal structure 18 provides structural integrity to the wing 10, functioning as the main load carrying structure by opening the fabric sail 12 to its wing-like form and maintaining that form while in flight. In the open or deployed position, the leading edge spars 20a, 20b form the basic, swept-back, delta wing commonly known in the aeronautical art. The cross spars 22a, 22b lock the leading edge spars into place, thereby preventing the wing 10 from closing during operation. The kingpost 26 is erected to provide an upward attachment point for upper wires 26a, b which support the wing on landing and when the wing experiences negative loads or inverted flight, while the keel 24 supports both the cross spars and kingpost. Consequently, all of the above elements have a sufficient diameter and are formed of a suitable material to attain a mechanical strength sufficient to maintain the wing form while operating with a payload. In one embodiment, the leading edge spar length can be about 17.5 feet to about 18.5 feet for a 30 foot span wing with a diameter of about 2.5 inches to about 3.0 inches for use with a payload up to about 1,500 pounds. Suitable spar materials include, but are not limited to: aluminum and other light-weight metals such as stainless steel and others, and composites such as epoxy graphite and others commonly known in the art.

Referring now to FIG. 2 there is illustrated a perspective view of wing 10 in its closed or pre-deployed configuration. In the pre-deployed position leading edge spars 20a, 20b and cross spars 22a, 22b are pivoted closed such that they rest substantially parallel to keel 24 (not shown). In this position common slider 32 is disposed adjacent the foremost point 16 and kingpost 26 is disposed adjacent and substantially parallel to keel 24 (not shown). In order to hold wing 10 in the pre-deployed configuration, integral cover 13 is zipped closed by matingly engaging the teeth of zipper members 15a, b in a conventional manner. In the present embodiment cover 13 is preferably made of dacron fabric while zipper members 15a, b are of a sufficiently high strength and durability to operate under deployment conditions, although other materials may be utilized depending upon the design configurations of the wing.

To maintain the wing 10 in the closed position a strap 39 having an anchor end 36a and a release end 36b is connected to the underside of leading edge spars 20a and 20b at spool members 37a, 37b, respectively. Anchor end 36a includes a triangular member 38 for connection to a trigger cable 40 which is adjacent release end 36b. Trigger cable 40 is preferably operatively connected to triangular member 38 at one end via a release line 41 which is knotted into a three loop release as shown in FIG. 2A, that holds release line 41 in place and also holds the strap closed, about cover 13. Trigger cable 40 is preferably attached at its opposite end to a drogue parachute 66. Upon deployment of the drogue parachute trigger cable 40 is disengaged from release line 41 which allows line 41 to unknot, thereby releasing the anchor end 36a from engagement with release end 36b thus allowing wing 10 to open into its deployed configuration, as described in greater detail below.

Referring now to FIG. 3 there is illustrated a side view of wing 10 and cargo pod 50. Cargo pod 50 which is adapted to carry a payload, is preferably attached to wing 10 by a wing mounting member 42. In the present embodiment mounting member 42 is a beam which is preferably connected to keel 24 by plate members 44a, 44b and faceplates 17a, b, both of which are bolted to mounting member 42 and keel 24, although alternate methods which provide sufficient strength to attach the payload to the beam may be utilized. Wing mounting member 42 is adapted to receive a detachable extension 45 which preferably includes a male fitting 46 for receipt into the mounting member as shown in FIGS. 4 and 5. Detachable extension 45 effectively extends the length of the wing mounting member 42 to the fill length of the packaged wing as shown in FIGS. 2 and 3.

As illustrated in FIGS. 4 and 5, detachable extension 45 includes a wing deployment assist mechanism 48 and a parachute mounting plate 68 mounted thereto. Deployment assist mechanism 48 includes first and second mounting plates 52a, 52b, a pair of tubular members 53a, 53b disposed between mounting plates 52a, b and a slider assembly 54. Mounting plates 52a, b preferably mount the deployment assist mechanism to the detachable extension, although other mounting methods known in the art may be utilized. Mounting plate 52a preferably include a circumferential hole 55 disposed therethrough for receipt of a lanyard 57. Lanyard 57 extends through hole 55, between tubular members 53,b through a hole in block 59 and is attached to pivoting arms 58a, 58b which are part of slider assembly 54.

Slider assembly 54 further includes spring members 60a, 60b which are mounted at one end to sliders 61a, 61b and are mounted at an opposite end to sliders 63a, 63b, respectively. The spring members 60a, 60b and sliders 61a, b and 63a, b are all circumferentially disposed about their respective tubular members 53a, 53b for longitudinal movement therealong. In order to place wing 10 in the closed or pre-deployed position slider assembly 54 is moved in the longitudinal direction as represented by arrow "D" by pulling on lanyard 57 in the direction of arrow "E" so as to compress spring members 60a, 60b against second mounting plate 52b. In this pre-deployed position pivoting arms 58a, 58b are pivoted so as to be substantially parallel with tubular members 53a, 53b and notches 64a, 64b disposed at one end of the pivoting arms engage spool members 37a, 37b, (FIG. 8) respectively. Wing deployment assist mechanism 48 is held in this pre-deployment position against the biasing force created by compressed spring members 60a, 60b by cover 13 which is zipped into the closed position and fastened by strap 39. By mounting the deployment assist mechanism aft, on the detachable extension, structural strength is added to the leading edge spars when they are held in the close position, thus increasing the durability of the wing upon extraction from an aircraft.

Referring again to FIG. 2, detachable extension 45 further includes parachute mounting plate 68 fastened thereto. Mounting plate 68 includes a plurality of holes 70 (FIGS. 4–5) disposed therethrough, each hole 70 being of sufficient size to receive a corresponding loop 72. Loops 72 are preferably part of parachute bag 74 which includes a pilot parachute 65 and a drogue parachute 66. Parachutes 65, 66 are utilized to deploy wing 10 as described hereinbelow. By mounting the parachutes to the detachable extension, the parachutes are able to deploy without interfering with the opening of the wing.

To mount parachute bag 74, and hence parachutes 65, 66 to detachable extension 45, the loops 72 of bag 74 are placed through their corresponding hole(s) 70. A cable 76 which is attached to the pilot parachute 65 is then threaded through the loops thereby securing parachutes 65, 66 to mounting plate 68 and extension 45. Upon deployment from an aircraft the pilot parachute will deploy, stabilize wing 10 and upon receipt of a signal from a controller the pilot parachute will pull cable 76 through the loops, thereby releasing the drogue parachute 66 from mounting plate 68 as described in greater detail hereinbelow.

Referring now to FIGS. 6 and 7, there is illustrated a perspective view of releasable pulley mechanism 27 according to the present application. As described hereinabove, both releasable pulley mechanism 27 and kingpost 26 are mounted to slider 32 which includes a tubular member 80 mounted to keel 24 of wing 10. Pulley mechanism 27 is mounted to the common slider such that longitudinal movement of slider 32 in the direction of arrow "F" causes corresponding movement of the pulley mechanism in the direction of arrow "F". Pulley mechanism 27 includes support member 81, fastener 82, a latching member 84, a swing arm 86 and a roller assembly 88. Roller assembly 88 includes a shaft 90 disposed therethrough which engages a slot 91 disposed in arm 92 of support member 81. Shaft 90 is held in slot 91 by latching member 84 which preferably engages a flat surface disposed on shaft 90. Latching member 84 is pivotally attached to arm 92 at a first end 84a thereof by pin 85 and engages fastener 82 at a second end 84b. Fastener 82 is pivotally attached to arm 92 of support member 81 by pin 87, includes cut-out 82a which engages latching member 84, and further includes tab 82b which engages keel 24 through slot 94 disposed through slider 32. Swing arm 86 is also pivotally attached to support member 81 by a pin 93.

With continued reference to FIGS. 6 and 7 in conjunction with FIG. 5, release line 77 extends from drogue parachute 66, through detachable extension 45, around roller assembly 88 and back to extension 45 where it is anchored. Upon release of the drogue parachute, from mounting plate 68 as described hereinabove, a biasing force is created in the direction of arrow "G" which results in a biasing force being created on latching member 84 by pin 90. The biasing force created on latching member 84 by pin 90 causes second end 84b to exert a force against cutout 82a in the direction represented by arrow "H". The force exerted on cutout 82a in the direction of arrow "H" causes tab 82b to be biased against keel 24 thereby preventing latching member 84 from pivoting about pin 85, thus holding latching member 84 against the force exerted by release line 77. By holding latching member 84 in the position shown in FIG. 6, shaft 90 is held in slot 91 thereby holding roller assembly 88 in a closed position against the force exerted by the opening of drogue parachute 66.

The force exerted by the release line 77 on roller assembly 88 from the opening of drogue parachute 66 causes slider 32 to move longitudinally along keel 24 in the direction of arrow "F". At a predetermined position slider 32 travels over slot 25 until tab 82b which is biased against keel 24 when the pulley is in its closed position, contacts slot 25. When tab 82b travels over slot 25 it is no longer biased against keel 24 and the force exerted on the tab 82b, as described above, causes fastener 82 to pivot about pin 87 in the direction represented by arrow "H", thereby dropping tab 82b into slot 25. Pivoting fastener 82 about pin 87 releases latching member 84 from engagement with fastener 82 thereby allowing the force exerted by pin 90 on latching member 84 to pivot the latching member about pin 85 in the direction of arrow "J" which allows pin 90 to be released from slot 91. Upon release of pin 90 from slot 91, the force exerted by release line 77 causes swing arm 86 to pivot about pin 93 in the direction of arrow "K" there by "popping" roller assembly 88 open and releasing line 77 as shown in FIG. 7. In order to provide controlled movement of slider 32 along keel 24, a strap 41 may be attached to the slider at an end opposite release line 77. This strap is preferably attached at an opposite end to faceplates 17a, b, is made of a material, such as webbing to provide controlled resistance against the force exerted by release line 77 thereby allowing for smooth movement of slider 32 along keel 24.

The deployment of wing 10 will now be described with reference FIGS. 1–11. Referring initially to FIG. 2, deployable wing is first placed in its closed or pre-deployment configuration. As described hereinabove, in the pre-deployment position leading edge spars 20a, 20b and cross spars 22a, 22b are pivoted closed such that they rest substantially parallel to keel 24 (not shown). In this position common slider 32 is disposed adjacent the foremost point 16 and kingpost 26 is disposed adjacent and substantially parallel to keel 24 (not shown). In order to hold wing 10 in the pre-deployed configuration, integral cover 13 is zipped closed by matingly engaging the teeth of zipper members 15a, b in a conventional manner.

Figure 9:
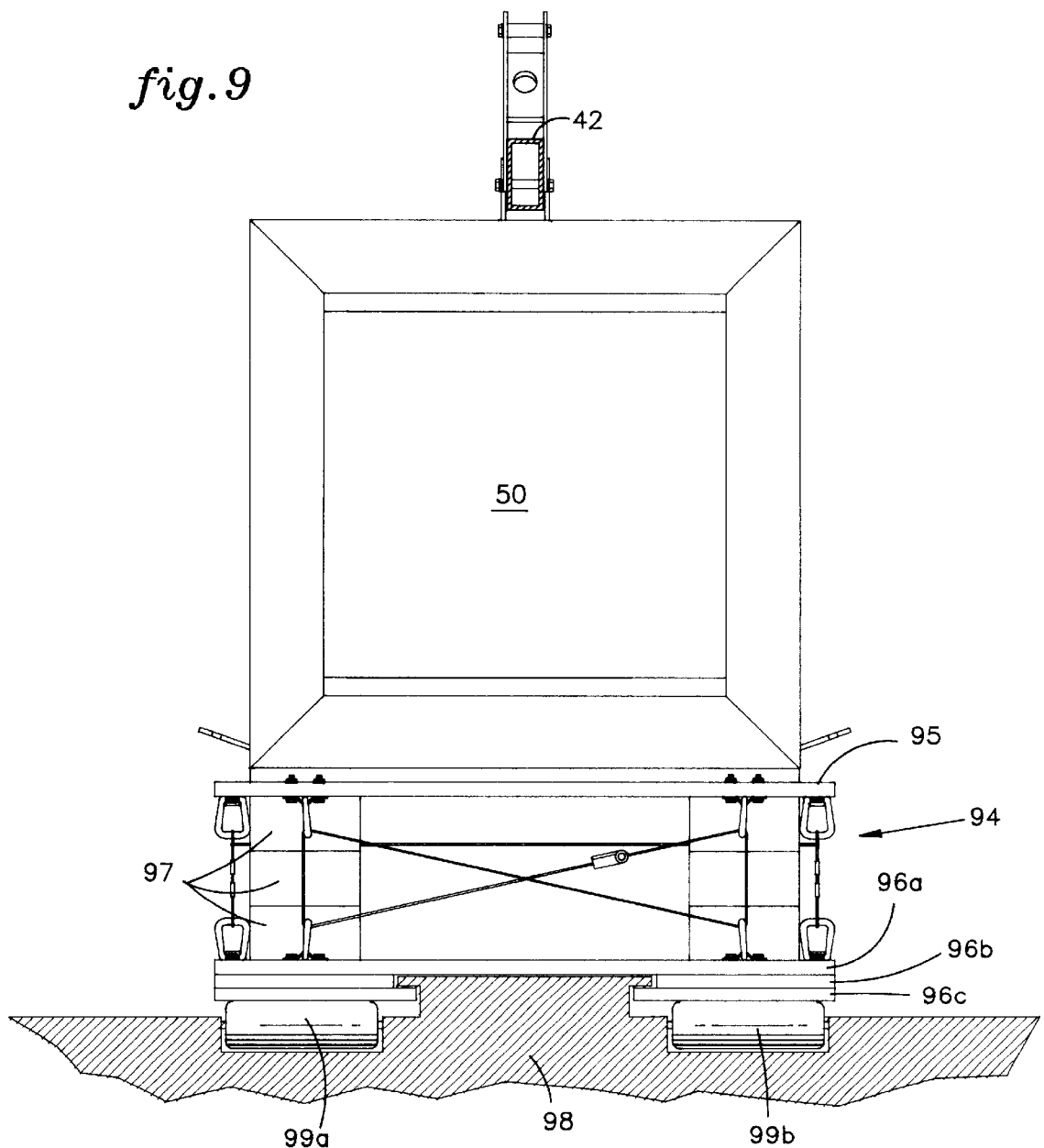
FIG. 9 is a rear view of the deployable wing disposed within an aircraft.
Figure 10:
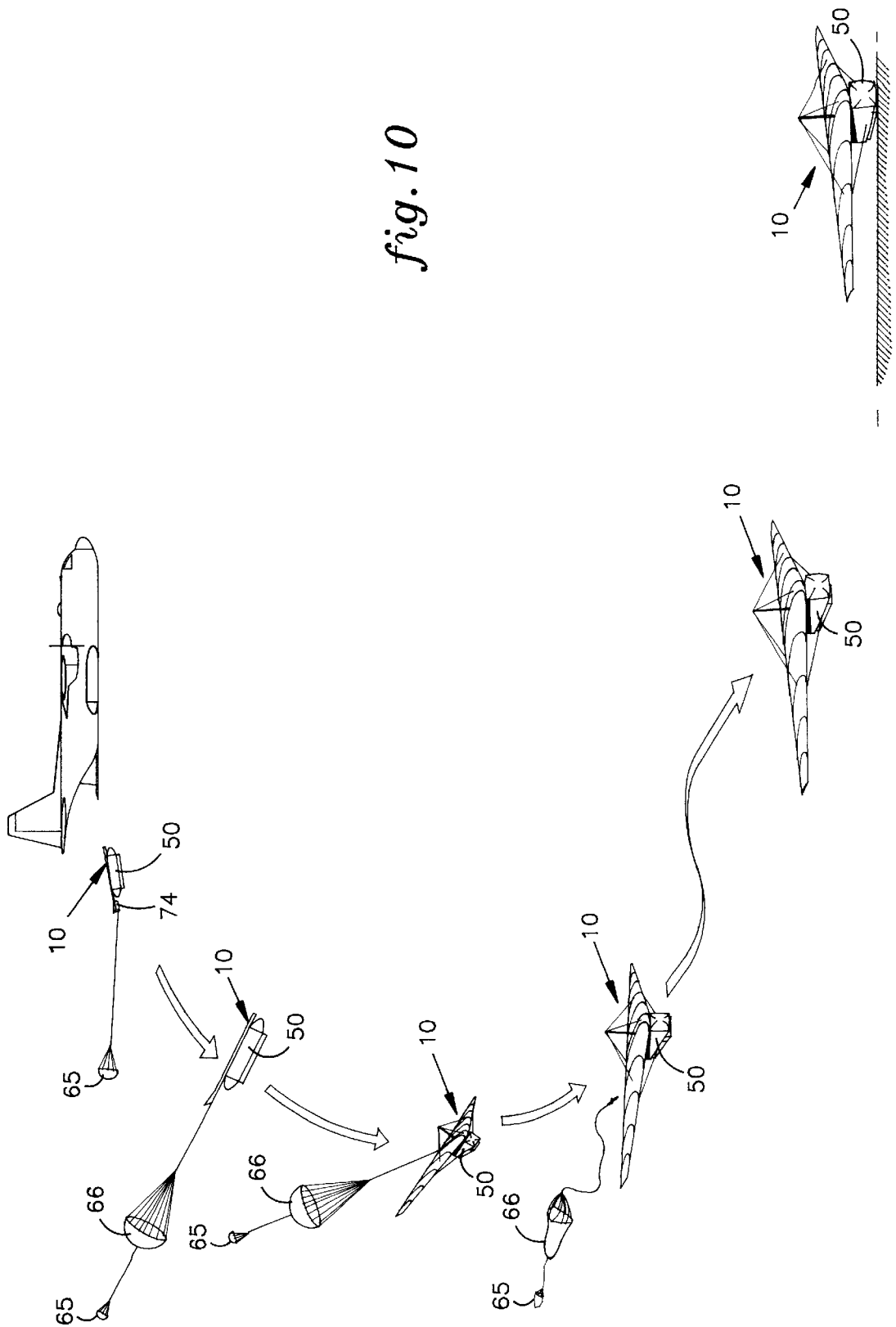
FIG. 10 illustrates the deployment of the wing of the embodiment of FIG. 1 from an aircraft.

After placing wing 10 into its pre-deployment configuration, the wing is ready to be deployed from an aircraft. Referring now to FIGS. 9 and 10, in the present embodiment wing 10 is preferably extracted from an airplane, such as an Airforce C-130 airplane. In order to secure the wing inside the airplane and to facilitate its extraction therefrom, the present embodiment includes a platform 94 mounted to the underside of cargo pod 50. The platform 94 preferable includes a base 95 which is mounted to pod 50 and also includes extraction members 96a, b, c which are mounted to base 95 via landing blocks 97. In the present embodiment landing blocks 97 are made of honeycomb and act to cushion the wing upon landing, although other shock-absorbing material may be utilized.

As illustrated in FIG. 9, floor 98 of the C-130 preferably includes a "T" shape member extending therefrom, the floor having a pair of rollers 99a, 99b disposed therein, on either side of the "T" shape member. By mounting base 95 to pod 50 and positioning the extraction members 96a, b, c in the arrangement shown in FIG. 9, the platform 94 is able to engage the "T" shape to provide stability to the wing while facilitating movement of the pod along rollers 99a, b and out of the aircraft. The present embodiment is adapted for extraction from a C-130, it is however expected that other aircraft will be utilized for deployment of the wing. The aircraft utilized will determine if a platform is desired and the configuration of the platform, if utilized.

After positioning platform 94 over the "T" shape member and on rollers 99a, 99b, the wing is ready to be extracted from the aircraft. When the aircraft has reached the site over which wing 10 is to be deployed, the wing is rolled over rollers 99a, b to the back of the aircraft and exits therefrom as shown in FIG. 10. Upon exiting the aircraft a static line deploys pilot parachute 65 which decelerates and stabilizes the wing 10. Once stable, a release mechanism initiated by either a timer, an altimeter, or other signal releases the drogue parachute 66 which is attached to the pilot parachute, as described hereinabove.

Figure 8:
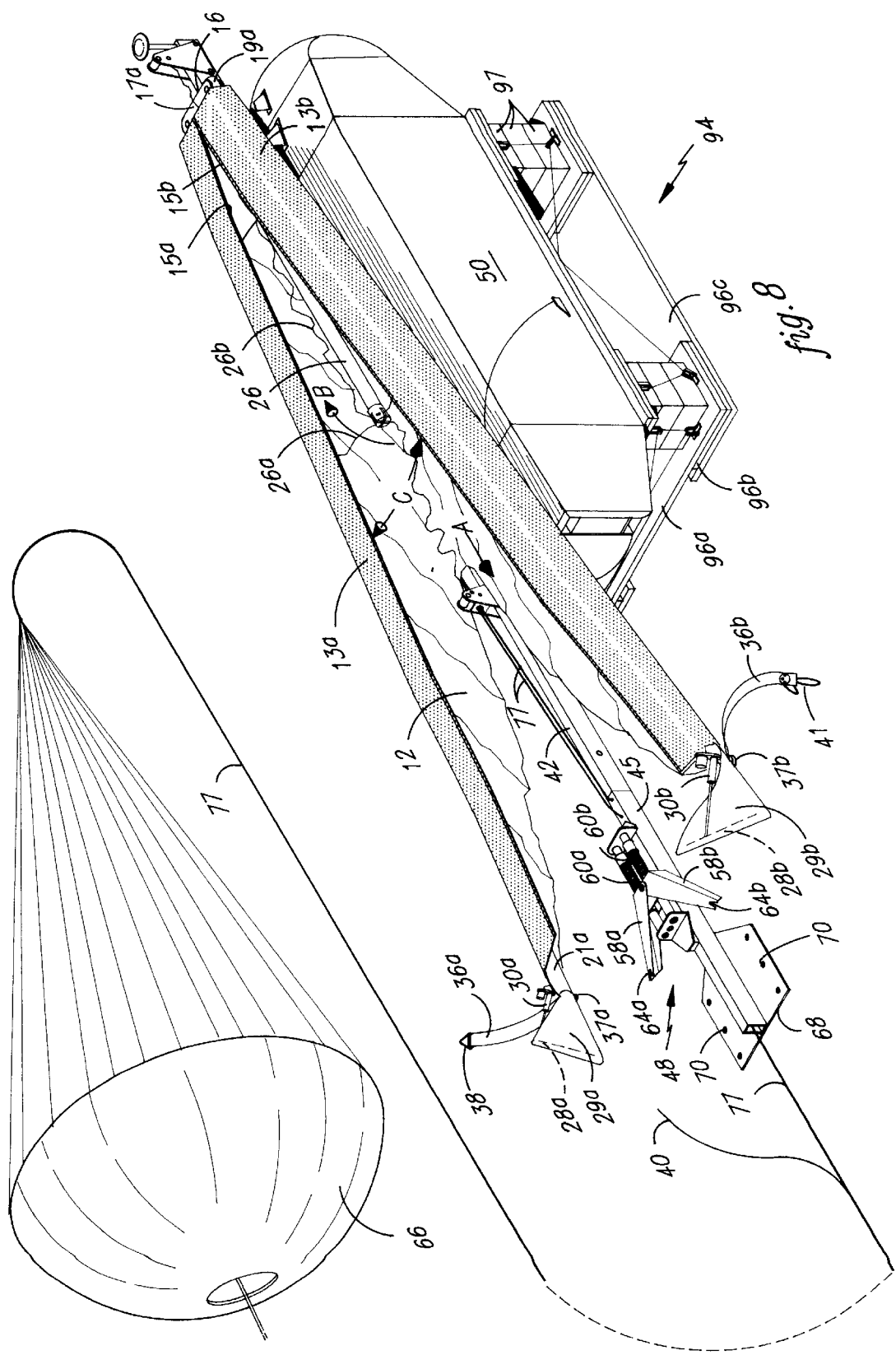
FIG. 8 is a perspective view of the deployable wing of FIG. 1 commencing deployment.

Drogue parachute 66 is connected both to trigger cable 40 and release line 77 as shown in FIG. 8. As the drogue parachute is deployed, trigger cable 40 is disengaged from release line 41 thereby releasing strap 39 from engagement about cover 13 as described hereinabove. Releasing strap 39 allows the biasing force created by springs 60a, b to open the deployment assist mechanism 48 thereby disengaging zipper member 15a from 15b, opening cover 13 and starting the outward movement of leading edge spars 20a, 20b. As the deployment assist mechanism is opening, release line 77 starts the movement of slider 32 longitudinally along keel 24 as described hereinabove.

Figure 11:
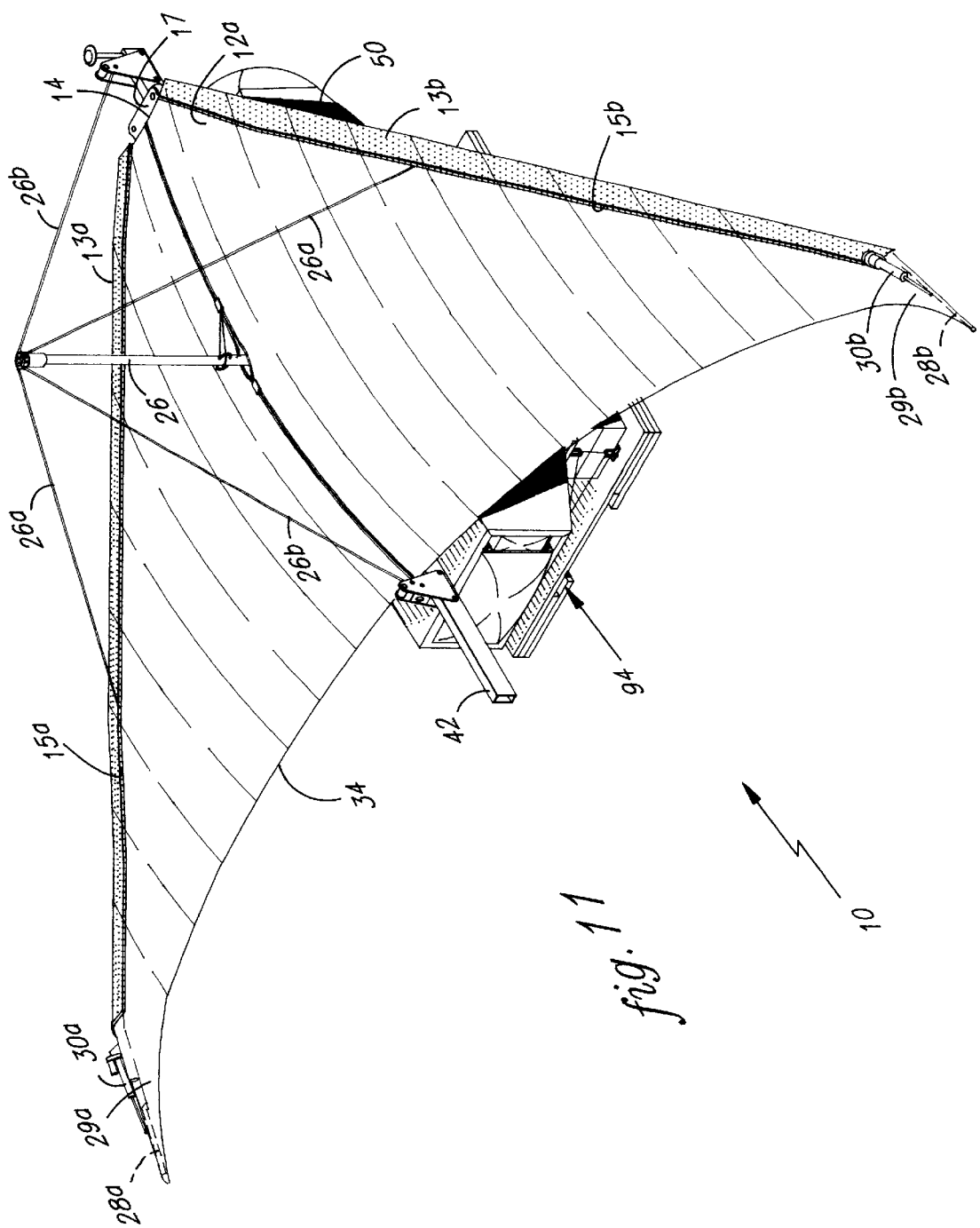
FIG. 11 is a perspective view of one embodiment of the deployable wing according to the present application.

With continued reference to FIG. 8, longitudinal movement of slider 32 in the direction of arrow "A" causes kingpost 26 to move in the direction of arrow "B" from a position substantially parallel to keel to a position substantially perpendicular to keel 24 as shown in FIGS. 1 and 11. Movement of slider 32 in the direction of arrow "A" also causes cross spars 22a, b which are pivotally attached to the slider to pivot in the direction represented by arrow "C" which extends the cross spars from a closed position substantially parallel to the keel to an open position as shown in FIG. 1. As the cross spars are extended, leading edge spars 20a, b are pushed in the direction of arrow "C" by the cross spars. Movement of slider 32 further causes corresponding movement of pulley mechanism 27, longitudinally in the direction of arrow "F" as shown in FIG. 6 and described hereinabove. When pulley mechanism 27 reaches slot 25 in keel 24, it locks the cross spars and hence the leading edges in place and releases line 77 from engagement with pulley mechanism 27 as described hereinabove.

Referring now to FIG. 10, release of line 77 from pulley mechanism 27 transfers the force created from the opening of drogue parachute 66 to extension 45 where release line 77 is anchored. This force results in extension 45 being disengaged from mounting member 42 along with pilot parachute 65 and drogue parachute 66 thereby allowing wing 10 to begin flight and fly to a predetermined landing area where it preferably glides to a landing. Extension member 45 and deployable wing 10 can both be recovered and re-used in subsequent flights.

The deployable wing of the present application is capable of reliable deployment from an aircraft and can provide unmanned cargo delivery.

It will be understood that various modifications may be made to the embodiments disclosed herein. For example, although the present application discloses extraction from a C-130 airplane, other aircraft, including other airplanes and helicopters is also within the scope of the present application. Therefore, the above description should not be construed as limiting, but merely as exemplifications of the preferred embodiments. Those skilled in the art will envision other modifications within the scope and spirit of the claims appended hereto.

What is claimed is:

1. A deployable wing, comprising:
   a.) a fabric sail having an upper section joined to a lower section and including an air intake opening;
   b.) an internal structure disposed substantially between said upper section and said lower section, said internal structure including at least two leading edge spars joined at a first end, a keel adjacent to and disposed substantially between said leading edge spars, and at least two cross spars pivotally attached to said leading edge spars and said keel; and
   c.) a detachable extension removable mounted to said wing.

2. The deployable wing of claim 1, wherein said keel includes a slider mounted thereto, said slider being movable in a longitudinal direction along said keel.

3. The deployable wing of claim 1, further comprising a wing mounting member adjacent to and connected to said keel, wherein said detachable extension is removably mounted to said wing by said wing mounting member.

4. The deployable wing of claim 3, wherein said detachable extension includes a male fitting at one end thereof, said male fitting being insertable into said wing mounting member.

5. The deployable wing of claim 3, wherein said detachable extension further includes a deployment assist mechanism mounted thereto, said deployment assist mechanism initiating movement of said leading edge spars upon deployment of said wing.

6. The deployable wing of claim 5, wherein said deployment assist mechanism includes a slider assembly.

7. The deployable wing of claim 6, wherein said deployment assist mechanism further includes at least one tubular member.

8. A deployable wing, comprising:
   a fabric sail having an upper section joined to a lower section and including an air intake opening;
   an internal structure disposed substantially between said upper section and said lower section, said internal structure including at least two leading edge spars joined at a first end, a keel adjacent and disposed substantially between said leading edge spars, and at least two cross spars pivotally attached to said leading edge spars and said keel;
   a wing mounting member adjacent to and connected to said keel;
   a detachable extension removably mounted to said mounting member, said detachable extension includes a deployment assist mechanism mounted thereto, said deployment assist mechanism initiating movement of said leading edge spars upon deployment of said wing, said deployment assist mechanism includes a slider assembly and at least one tubular member,
   said slider assembly includes at least one spring member, said spring member being mounted at either end to a slider, said sliders and said at least one spring member being circumferentially disposed about said at least one tubular member for longitudinal movement therealong;
   wherein said detachable extension is removably mounted to said wing mounting member.

9. The deployable wing of claim 8, wherein said slider assembly further includes at least one pivoting arm.

10. A deployable wing, comprising:
    a fabric sail having an upper section joined to a lower section and including an air intake opening;
    an internal structure disposed substantially between said upper section and said lower section, said internal structure including at least two leading edge spars joined at a first end, a keel adjacent and disposed substantially between said leading edge spars, said keel includes a slider mounted thereto, said slider being movable in a longitudinal direction along said keel, a wing mounting member adjacent and connected to said keel, and at least two cross spars pivotally attached to said leading edge spars and said keel;
    a releasable pulley mechanism mounted to said slider and, a detachable extension removably mounted to said mounting member;
    wherein longitudinal movement of said slider causes corresponding longitudinal movement of said pulley mechanism.

11. The deployable wing of claim 2, further comprising a releasable pulley mechanism mounted to said slider, wherein longitudinal movement of said slider causes corresponding longitudinal movement of said pulley mechanism.

12. A deployable wing, comprising:
    a.) a fabric sail having an upper section joined to a lower section and including an air intake opening;
    b.) a keel member substantially disposed within said fabric sail, said keel including a slider mounted thereto, said slider being movable in a longitudinal direction along said keel;

c.) a releasable pulley mechanism mounted to said slider, wherein longitudinal movement of said slider causes corresponding longitudinal movement of said pulley mechanism.

13. The deployable wing of claim 12, wherein said releasable pulley mechanism includes a support member, a fastener, a latching member, a swing arm and a roller assembly.

14. The deployable wing of claim 13, wherein said roller assembly includes a shaft, said shaft engaging a slot disposed in said support member.

15. The deployable wing of claim 14, wherein said shaft is held in said slot by engagement of said latching member.

16. The deployable wing of claim 13, wherein said latching member is pivotally attached to said support member at a first end thereof and engages said fastener at a second end thereof.

17. The deployable wing of claim 13, wherein said fastener is pivotally attached to said support member, is engaged by said latching member and includes a tab.

18. The deployable wing of claim 17, wherein said tab engages said keel through a slot disposed through said slider in one position.

19. The deployable wing of claim 13, further comprising a detachable extension removable mounted to said wing.

20. The deployable wing of claim 19, further comprising a release line, said line extending through said detachable extension, around said roller assembly and anchored to said detachable extension, wherein releasing said line from said roller assembly causes said detachable extension to disengage from said wing.

21. A method for deploying a wing, said wing including a pair of leading edge spars joined at a first end, a keel adjacent to and disposed substantially between said leading edge spars, a slider mounted to said keel, and at least two cross spars pivotally attached to said leading edge spars and said slider, said method comprising the steps of:

a) moving the wing from a pre-deployed configuration to an open configuration, said movement including;
   i. moving said leading edge spars from a first position substantially parallel to said keel to a second position at an angle with respect to said keel;
   ii. moving said slider longitudinally along said keel;
   iii. moving said at least two cross spars from a closed position, substantially parallel to said keel, to an open position extending from said keel;
   iv. moving a pulley mechanism attached to said slider longitudinally along said keel;

b) disengaging a detachable extension mounted to said wing by a mounting member.

22. The method of claim 21, further comprising the steps of stabilizing said wing by deploying at least one parachute attached to said detachable extension.

23. The method of claim 21, further comprising the step of initiating movement of said leading edge spars by use of a deployment assist mechanism.

24. The method of claim 21, further comprising the step of releasing a line extending through said detachable extension, around said pulley mechanism and anchored to said detachable extension wherein releasing said line causes disengagement of said detachable extension from said wing.

* * * * *